United States Patent
Shaik et al.

(10) Patent No.: US 8,737,202 B2
(45) Date of Patent: May 27, 2014

(54) AUTOMATIC CONNECTION RECOVERY

(75) Inventors: Shanawaz Shaik, Ottawa (CA);
Kugendran Sabaratnam, Kanata (CA);
Mike Vihtari, Ottawa (CA); Xiong Xue,
Kanata (CA)

(73) Assignee: Alcatel Lucent, Paris (FR)

( * ) Notice: Subject to any disclaimer, the term of this patent is extended or adjusted under 35 U.S.C. 154(b) by 49 days.

(21) Appl. No.: 13/482,728

(22) Filed: May 29, 2012

(65) Prior Publication Data
US 2013/0322230 A1 Dec. 5, 2013

(51) Int. Cl.
*G01R 31/08* (2006.01)
(52) U.S. Cl.
USPC ............................................. 370/225; 714/2
(58) Field of Classification Search
USPC .......... 370/216, 225–228; 714/2, 3, 4.1, 4.11, 714/4.12, 4.2, 4.21
See application file for complete search history.

(56) References Cited

U.S. PATENT DOCUMENTS

| 5,023,873 A * | 6/1991 | Stevenson et al. .............. 714/4.4 |
| 2007/0192053 A1 * | 8/2007 | Ohtani .......................... 702/122 |
| 2012/0278472 A1 * | 11/2012 | Ellis et al. ..................... 709/224 |

FOREIGN PATENT DOCUMENTS

JP          02186278 A    *    7/1990    ............. G01R 31/04

* cited by examiner

*Primary Examiner* — Kerri Rose
(74) *Attorney, Agent, or Firm* — Kramer Amado P.C.

(57) ABSTRACT

Various exemplary embodiments relate to a method and related network node including one or more of the following: selecting a connection of a plurality of connections; testing the selected connection to determine whether the selected connection is usable; and based on a determination that the selected connection is not usable: closing the selected connection and at least one additional connection of the plurality of connections, and reestablishing the selected connection and the at least one additional connection.

20 Claims, 3 Drawing Sheets

| | Server | Connection Number | Link Identifier |
|---|---|---|---|
| 340 | 0x1A | 1 | 54.210.147.113:389 |
| 350 | 0x1A | 2 | 54.210.147.113:390 |
| 360 | 0x1A | 3 | 54.210.147.113:391 |
| 370 | 0x1B | 1 | 167.201.64.131:389 |
| 380 | ... | ... | ... |

AUTOMATIC CONNECTION RECOVERY

TECHNICAL FIELD

Various exemplary embodiments disclosed herein relate generally to communications systems.

BACKGROUND

In many systems, computing devices may store or access data in external storage devices. Such an interface between computing and storage devices may be implemented according to many different methods. For example, the computing device may access records in a database according to the lightweight directory access protocol (LDAP). In such arrangements, it is often advantageous to maintain a persistent connection to the external storage device such that the overhead associated with establishing a new connection is not encountered whenever a device wished to create, read, update, or delete (CRUD) a record stored by the storage device.

As the state of the network, computing device, or storage device changes however, a cached connection may become unusable, or "dirty." Such a dirty connection may occur, for example, when a storage device reboots, switches over to a new primary storage device in a redundant pair, or when there are network connection problems. After a connection becomes dirty, subsequent attempts by the computing device to use the connection for a CRUD operation may fail.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for automatically recovering connections to another device, the method including: selecting a connection of a plurality of connections; testing the selected connection to determine whether the selected connection is usable; and based on a determination that the selected connection is not usable: closing the selected connection and at least one additional connection of the plurality of connections, and reestablishing the selected connection and the at least one additional connection.

Various exemplary embodiments relate to a network device for automatically recovering connections to another device, the network device including: an interface configured to communicate with at least the other device; a connection cache configured to store information associated with a plurality of connections; a connection tester configured to: select a connection of the plurality of connections, test the selected connection via the interface to determine whether the selected connection is usable, and based on a determination that the selected connection is not usable, close the selected connection and at least one additional connection of the plurality of connections; and a connection establisher configured to reestablish the selected connection and the at least one additional connection.

Various exemplary embodiments relate to a non-transitory machine-readable storage medium encoded with instructions for execution by a network device for automatically recovering connections to another device, the medium including: instructions for selecting a connection of a plurality of connections; instructions for testing the selected connection to determine whether the selected connection is usable; and instructions for, based on a determination that the selected connection is not usable: closing the selected connection and at least one additional connection of the plurality of connections, and reestablishing the selected connection and the at least one additional connection.

Various embodiments are described wherein the plurality of connections include connections to a Lightweight Directory Access Protocol (LDAP) database and the network device includes a Policy and Charging Rules Node (PCRN).

Various embodiments are described wherein the selected connection is a connection to a first device and the step of reestablishing the selected connection and the at least one additional connection includes establishing at least one new connection to a second device.

Various embodiments are described wherein the step of selecting a connection of a plurality of connections is performed periodically based on a timer task.

Various embodiments are described wherein the step of testing the selected connection includes attempting a read operation in association with the selected connection.

Various embodiments are described wherein the step of reestablishing the selected connection and the at least one additional connection includes: attempting to establish a first new connection to a primary server; and establishing at least one additional connection to the primary server based on the attempt to establish the first new connection being successful.

Various embodiments are described wherein the step of reestablishing the selected connection and the at least one additional connection further includes: attempting to establish a second new connection to a first secondary server based on the attempt to establish the first new connection being unsuccessful; and establishing at least one additional connection to the first secondary server based on the attempt to establish the second new connection being successful.

Various embodiments are described wherein a second secondary server is associated with the primary server and the step of reestablishing the selected connection and the at least one additional connection further includes attempting to establish a third new connection to a second secondary server based on the attempt to establish the second new connection being unsuccessful.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

In view of the foregoing, it would be desirable to provide a method and system capable of detecting and remedying "dirty connections." In particular, it would be desirable to periodically test cached connections to an external device and, when such cached connections become unusable, establish new connections. It would be desirable to provide such automatic connection recovery for any persistent or in memory cached-in-memory connection maintained between any two devices.

Figure 1:
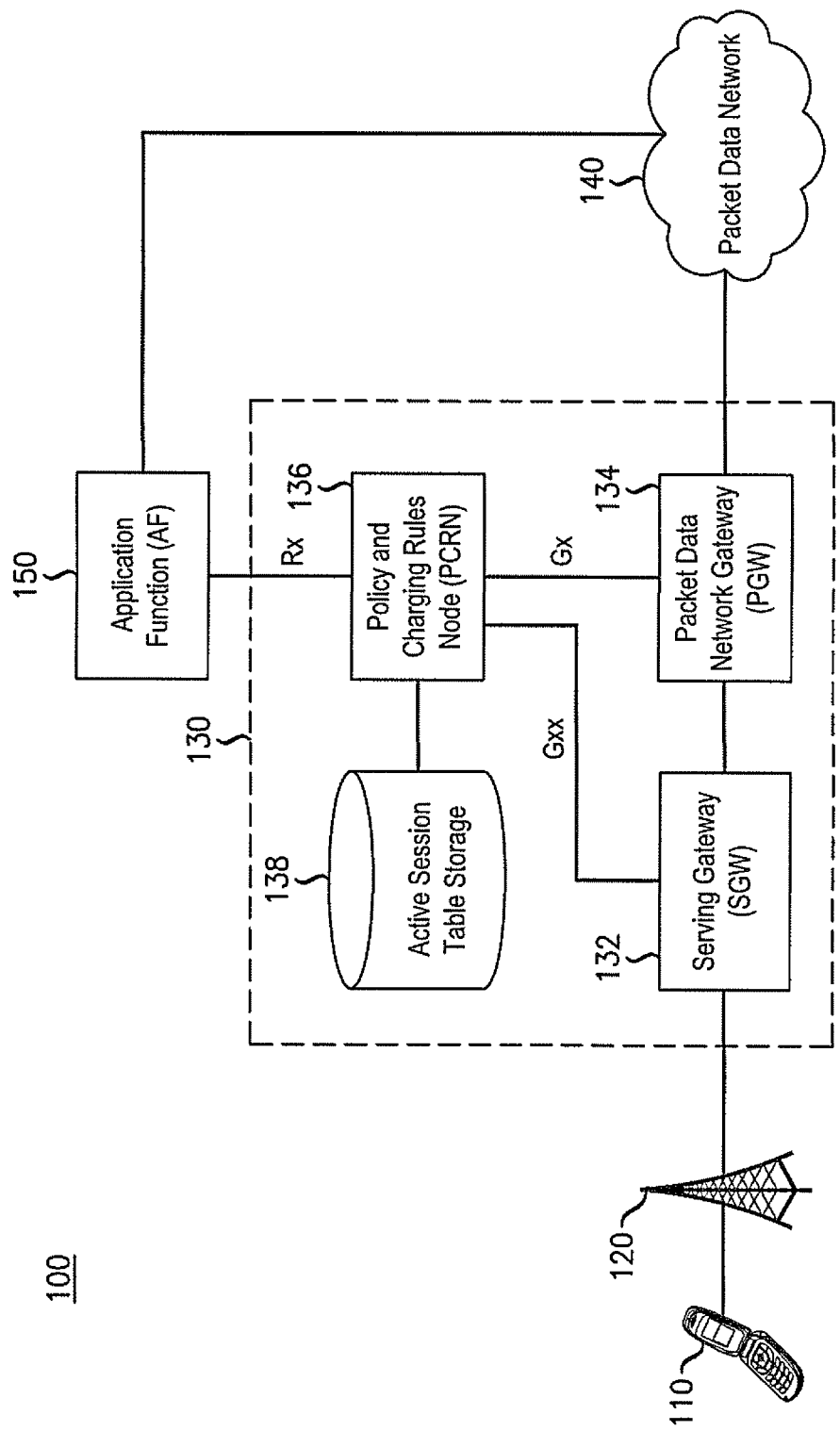
FIG. 1 illustrates an exemplary network system implementing automatic connection recovery.

FIG. 1 illustrates an exemplary network system 100 implementing automatic connection recovery. Exemplary network system may be a subscriber network for providing various services. In various embodiments, subscriber network 100 may be a public land mobile network (PLAIN). Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. EPC 130 may include a serving gateway (SGW) 132, a packet data network gateway (PGW) 134, and a policy and charging rules node (PCRN) 136, and an active session table storage 138.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 or other PCENs (not shown). PCRN 136 may be in communication with AF 150 via an Rx interface. As described in further detail below with respect to AF 150, PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Active session table storage 138 may be a device capable of storing active session data in an active session table. In various embodiments, active session table storage 138 may be an external LDAP server including a machine-readable storage medium such read-only memory (ROM), random-access memory (RAM), magnetic disk storage media, optical storage media, flash-memory devices, and similar storage media. The active session data stored in active session table storage 138 may include information related to a number of sessions managed by PCRN 136 or other PCRNs (not shown). Upon establishing a new session, PCRN 136 may write a new record to the active session table. As the PCRN 136 performs subsequent operations with regard to the session, PCRN 136 may read, update, or delete the record from the active session table. To provide such parallel and continued access to active session table storage, PCRN 136 may maintain one or more cached connections to the active session table storage 138.

Packet data network 140 may be any network for providing data communications between user equipment 110 and other devices connected to packet data network 140, such as AF 150. Packet data network 140 may further provide, for example, phone or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, or an identification of the particular service data flows that must be established in order to provide the requested service. AF 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-4.

As noted above, PCRN 136 may maintain a pool of cached connections to active session table storage 138. These connections may become dirty at some point. For example, active session table storage 138 may reboot or switch over to a new primary server. PCRN 136 may implement a heartbeat timer that periodically prompts PCRN 136 to evaluate the connection pool. After the heartbeat timer wakes, the PCRN 136 may select a connection from the connection pool and attempt an innocuous operation over the connection. For example, the PCRN 136 may attempt a read operation at the root level of active session table storage 138 over the selected connection. If the operation is successful, the heartbeat timer may go back to sleep. If the operation fails, on the other hand, the PCRN 136 may proceed to close all connections in the pool and establish a new pool of connections to active session table storage 138, thereby automatically recovering the connections before any sessions are impacted.

Figures 2, 3:
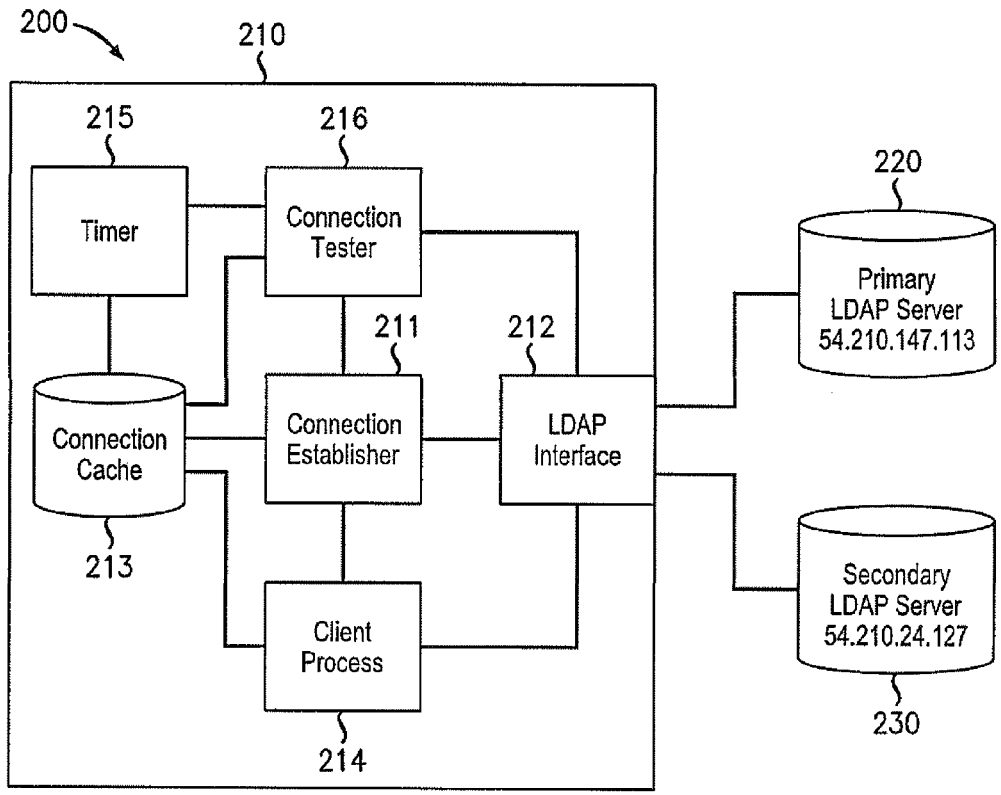
FIG. 2 illustrates an exemplary network system including a device providing automatic connection recovery and redundant storage devices.
FIG. 3 illustrates an exemplary data arrangement for storing cached connections.

FIG. 2 illustrates an exemplary network system 200 including a device 210 providing automatic connection recovery and redundant storage devices 220, 230. In various embodiments, device 210 may correspond to PCRN 136 of exemplary network 100 while storage devices 220, 230 may correspond to active session table storage 138 of exemplary network 100. It will be understood that the components of network 200 may correspond to alternative components of network 100 or components of other types of networks (not shown). For example, storage devices 220, 230 may correspond to a subscription profile repository (not shown). It will be understood that the various components described herein may be employed to automatically recover any type of cached connection that may become dirty or otherwise unusable during operation.

Device 200 may include a connection establisher 211, LDAP interface 212, connection cache 213, client process 214, timer 215, and connection tester 216. It will be understood that various components may share underlying hardware. For example, connection establisher 211, client process 214, timer 215, and connection tester 216 may share one or more processors.

Connection establisher 211 may include hardware or executable instructions on a machine-readable storage medium configured to establish one or more connections to external devices. For example, connection establisher 211 may establish a pool of connections with primary LDAP server 220 or secondary LDAP server 230. In establishing a connection to storage devices 220, 230, connection establisher 211 may negotiate a connection with the storage device 220, 230 via LDAP interface 212. After the connection has been established, connection establisher 211 may store information for accessing the connection in connection cache 213 for future use such as, for example, by client process 214 or connection tester 216. For example, connection establisher 213 may store an IP address and TCP socket which may be used to access the new connection. It will be understood that connection establisher 211 may establish connections with multiple devices which may be of different types.

Connection establisher 211 may be configured to establish connections on startup or upon instruction by another component such as client process 214 or connection tester 216. Connection establisher 211 may also be configured with the identity of the devices to which connections are to be established, the number of connections to be established to the device, an address of a primary server for the device, and one or more addresses of secondary servers. As an example of operation, upon device 210 starting up, connection establisher may first attempt to establish a connection with primary LDAP server 220. Connection establisher 211 may then receive an indication that the connection has been established and proceed to establish ninety nine additional connections to primary LDAP server 220. For each connection, connection establisher 211 may store information such as an IP address and TCP socket in connection cache.

LDAP interface 212 may be an interface including hardware or executable instructions encoded on a machine-readable storage medium configured to communicate with other devices. For example, LDAP interface 212 may include an Ethernet or TCP/IP interface. In various embodiments, LDAP interface 212 may include multiple physical ports.

Connection cache 213 may be any machine-readable medium capable of storing connection information. Accordingly, connection cache 213 may include a machine-readable storage medium such as read-only memory (ROM), random-access memory (RAM), magnetic disk storage media, optical storage media, flash-memory devices, and/or similar storage media. As will be described in further detail below with respect to FIG. 3, connection cache 213 may store connection information, such as a link identifier, capable of identifying and enabling subsequent use of a previously established connection.

Client process 214 may include hardware or executable instructions on a machine-readable storage medium configured to perform various functions that use connections to an LDAP server or other device. For example, in embodiments wherein device 210 is a PCRN such as PCRN 136, client process 214 may include a policy and charging rules function (PCRF) adapted to store session data in an active session table accessible via connections stored in connection cache 213. When client process 214 decides to access a remote device, such as storage devices 220, 230, client process 214 may select an appropriate connection from connection cache 213 and use the associated connection information to access the device over the selected connection. For example, client process 214 may use an established connection to create, read, update, or delete a record stored on primary LDAP server 220. Various other types of client process 214 and associated uses of cached connections by client process will be apparent.

Timer 215 may include hardware or executable instructions on a machine-readable storage medium configured to periodically prompt connection tester 216 to test connections store in connection cache 213. In various embodiments, timer 215 may include a task scheduler configured with a time interval for connection tester 216 to operate. For example, timer 215 may wake or otherwise prompt connection tester 216 every millisecond, every 10 seconds, or every minute. It will be appreciated that timer 215 may be configured to wake other tasks or components based on other intervals. Further, timer 215 may be configured to wake connection tester 216 at different intervals for different types of tests. For example, timer 215 may indicate that connection tester 216 should test connections to a first device every 10 milliseconds and may indicate that connection tester 216 should test connections to a second device every 2 seconds.

Connection tester 216 may include hardware or executable instructions on a machine-readable storage medium configured to test connections stored in connection cache 213 and initiate remedial actions when necessary. In various embodiments, connection tester 216 may periodically be prompted by timer 215 that a connection should be tested. Upon receiving such a prompt, connection tester 216 may select a representative connection for a pool of connections from connection cache 213. As used herein, a pool of connections will be understood to refer to a set of connections to a common device. For example, connection tester 216 may select the first encountered connection from the pool to be tested or may select a connection from the pool to be tested at random.

After selecting a representative connection, the connection tester 216 may test the selected connection by attempting an innocuous operation using the connection. For example, connection tester 216 may attempt to read a record at the rood level of primary LDAP server 220 via the selected connection. If the operation is successful, the connection tester 216 may end the inquiry here and wait for the next prompt from timer 215. Otherwise, if the operation fails, connection tester may determine that every connection in the pool may be dirty and unusable. Connection tester 216 may then remove the dirty connections from connection cache 213 and prompt connection establisher to establish a new pool of connections to the external device.

FIG. 3 illustrates an exemplary data arrangement 300 for storing cached connections. Data arrangement 300 may be, for example, a table in a database stored in connection cache 213. Alternatively, data arrangement 300 could be a series of linked lists, an array, or a similar data structure. Thus, it should be apparent that data arrangement 300 is an abstraction of the underlying data; any data structure suitable for storage of this data may be used.

Data structure may include a server field 310, connection number field 320, and a link identifier field 330. It will be appreciated that data structure 300 may include alternative or additional fields useful in identifying or utilizing a cached connection. Server field 310 may identify a server or other external device with which a connection is established. In various embodiments, multiple records may list the same server identifier because multiple connections may exist to a given external device. In such embodiments, connections to the same server may be referred to as belonging to the same connection pool. Connection number field 320 may identify to which connection within a pool a record is associated. Thus, in various embodiments, server field 310 and connection number field 320 may together uniquely identify a connection. Link identifier field 330 may include an IP address and TCP socket to be used when performing operations over the connection. As noted above, data arrangement 300 may include additional fields (not shown). For example, data arrangement 300 may include a token field (not shown) for storing an authentication token to be presented to the server when various operations are conducted over the connection. Various additional types of data that may be stored will be apparent.

As an example, connection record 340 may relate to a first connection to a server identified as 0x1A. This connection may be accessible at IP address 54.210.147.113, TCP socket 389. Connection records 350, 360 may relate to the second and third connections to server 0x1A, respectively, and may be associated with TCP/IP addresses 54.210.147.113:390 and 54.210.147.113:391, respectively. Because records 340, 350, 360 all relate to server 0x1A, the connections may belong to the same connection pool. Exemplary record 370, on the other hand, may belong to a different connection pool because record 370 may be associated with a different server, server 0x1B. Data arrangement 300 may include numerous additional records 380.

Figure 4:
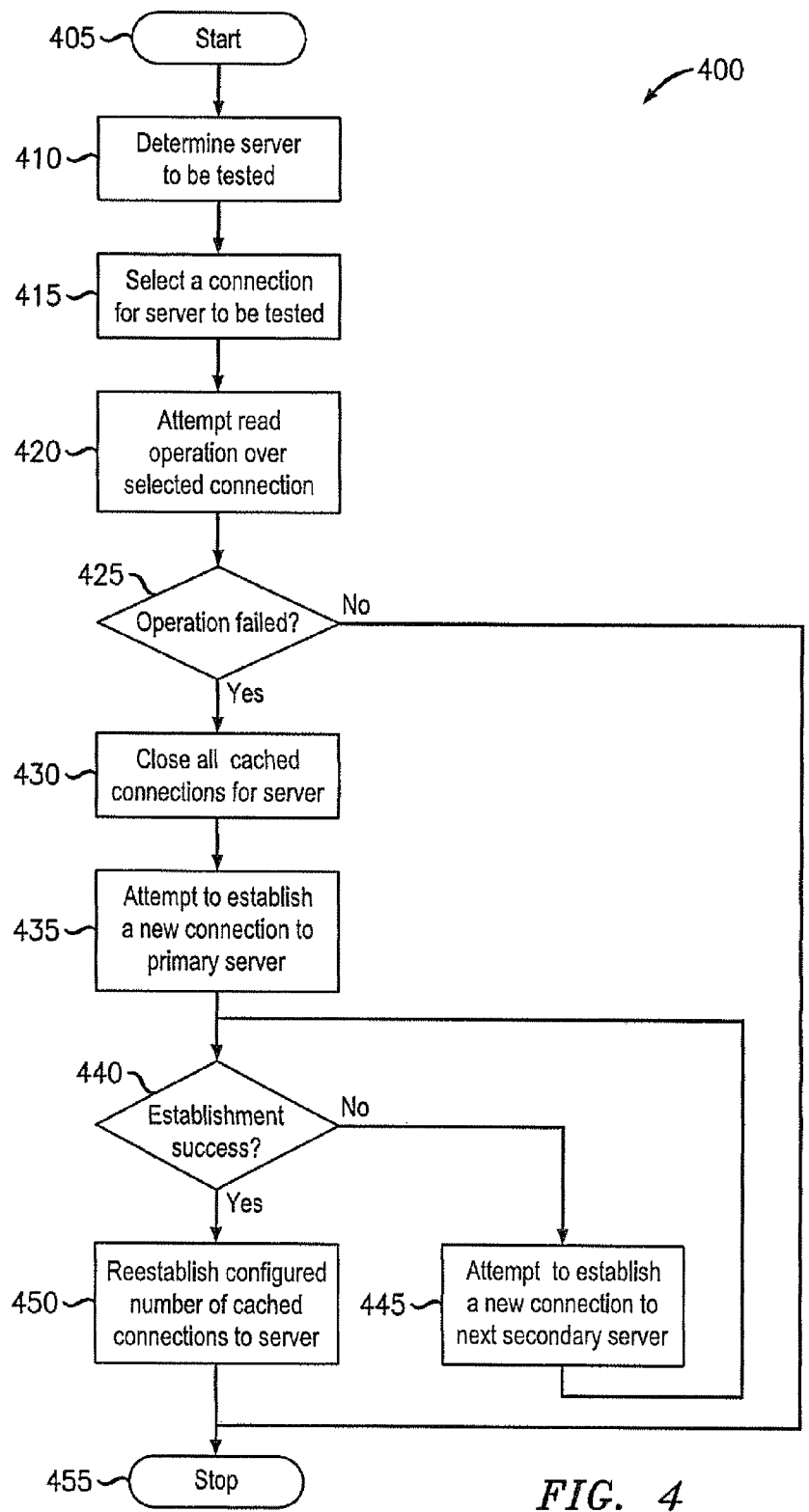
FIG. 4 illustrates an exemplary method for performing automatic connection recovery.

FIG. 4 illustrates an exemplary method 400 for performing automatic connection recovery. Method 400 may be performed by the components of a device such as device 200. For example, method 400 may be performed by connection establisher 211 or connection tester 216.

Method 400 may begin in step 405 and proceed to step 410 where the device may select a server to be tested. In various embodiments, the device may iterate through all servers with which the device maintains connections. In other embodiments, a heartbeat timer task may indicate which server is to be tested at the current time. Various alternative methods for selecting a server to test will be apparent. Next, in step 415, the device may select a connection for the server to be tested. In various embodiments, the device may simply select the first connection in the connection pool. Method 400 may then proceed to step 420 where the device may attempt an innocuous test operation, such as a root-level read operation, over the selected connection. Then, in step 425, the device may determine whether the operation failed. If the test operation was successful, method 400 may proceed to end in step 455.

If, on the other hand, the test operation fails, method 400 may proceed from step 425 to step 430. Because the test operation has failed, the device may determine that all connections in the same pool as the tested connection may be dirty. The device may then close all the connections for the server by, for example, removing records from a connection cache. Then, in step 435, the device may begin the reestablishment process by attempting to establish a new connection with a primary server. Then, in step 440, the device may determine whether the attempted connection establishment was a success. If the connection fails, then method 400 may proceed to step 445 where the device may select a secondary server associated with the primary server and attempt to establish a new connection. Method 400 may then loop back to step 440. Once the device successfully establishes a new connection to a server, the device may proceed to reestablish the rest of the connection pool in step 450 by establishing a number of new connections to the server. Method 400 may then proceed to end in step 455.

Having described exemplary components and methods for the operation of exemplary network 200, an example of the operation of device 210 will now be provided with reference to FIGS. 1-4. Device 210 may correspond to PCRN 136; Storage devices 220, 230 may correspond to active session table storage 138; data arrangement may described the contents of connection cache 213; and method 400 may describe the operation of PCRN 136, 210. Active session table storage 138 may correspond to device ID "0x1A." For the purposes of example, primary LDAP server 220 may currently be offline and secondary LDAP server may currently provide access to the active session table.

The process may begin sometime after primary LDAP server 220 goes offline when timer 215 determines that the connections to active session table storage 138 should be tested. Timer 215 may instruct connection tester 216 to test the connection pool to device 0x1A. Then, in step 415, connection tester may select connection record 340 from connection cache 213 as the connection to be tested. In step 420, connection tester 216 may attempt a root-level read operation at TCP/IP address 54,210,147,113:389, as indicated by connection record 340, which may include the IP address of primary LDAP server 220. Because primary LDAP server 220 is offline in this example, this operation may fail. Connection tester 216 may then, in step 430, close the connections to server 0x1A by deleting records 340, 350, 360 from connection cache 213. Connection tester 216 may then instruct connection establisher to reestablish the connection pool to device 0x1A.

In step 435, connection establisher may attempt to establish a new connection to primary LDAP server 220. Because the primary LDAP server 220 is offline for this example, this connection attempt may fail. Next, in step 445, the connection establisher may attempt to establish a new connection with secondary LDAP server 230. In this example, secondary LDAP server 230 may be available and the connection may be established successfully. Connection establisher 211 may then store a new record in connection cache 213 for server 0x1A including a link identifier such as 54.210.24.127:389. Connection establisher 211 may then, in step 450, proceed to repopulate the connection pool by establishing at least two additional connections with secondary LDAP server 230 to replace records 350, 360. The method may then end in step 455.

According to the foregoing, various embodiments enable the automatic recovery of dirty or otherwise unusable connections to external devices. By periodically testing connections to external devices, such as LDAP servers, dirty connections may be identified and recovered prior to the occurrence of a service-impacting event. Further, by testing a representative connection of a connection pool, overhead associated with discovering dirty connections may be reduced. Various additional advantages of the embodiments disclosed herein will be apparent.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for automatically recovering connections to another device, the method comprising:
   selecting a connection of a plurality of connections, wherein the step of selecting a connection of a plurality of connections is performed periodically based on a timer task;
   testing the selected connection to determine whether the selected connection is usable; and
   based on a determination that the selected connection is not usable:
   closing the selected connection and at least one additional connection of the plurality of connections, and reestablishing the selected connection and the at least one additional connection.

2. The method of claim 1, wherein the plurality of connections include connections to a Lightweight Directory Access Protocol (LDAP) database and the network device includes a Policy and Charging Rules Node (PCRN).

3. The method of claim 1, wherein the selected connection is a connection to a first device and the step of reestablishing the selected connection and the at least one additional connection comprises establishing at least one new connection to a second device.

4. The method of claim 1, wherein said timer task has a period between a millisecond and a minute.

5. The method of claim 1, wherein the step of testing the selected connection comprises attempting a read operation in association with the selected connection.

6. The method of claim 1, wherein the step of reestablishing the selected connection and the at least one additional connection comprises:
- attempting to establish a first new connection to a primary server; and
- establishing at least one additional connection to the primary server based on the attempt to establish the first new connection being successful.

7. The method of claim 6, wherein the step of reestablishing the selected connection and the at least one additional connection further comprises:
- attempting to establish a second new connection to a first secondary server based on the attempt to establish the first new connection being unsuccessful; and
- establishing at least one additional connection to the first secondary server based on the attempt to establish the second new connection being successful.

8. The method of claim 7, wherein a second secondary server is associated with the primary server and the step of reestablishing the selected connection and the at least one additional connection further comprises attempting to establish a third new connection to the second secondary server based on the attempt to establish the second new connection being unsuccessful.

9. A network device for automatically recovering connections to another device, the network device comprising:
- an interface configured to communicate with at least the other device;
- a connection cache configured to store information associated with a plurality of connections;
- a connection tester configured to:
  - select a connection of the plurality of connections,
  - test the selected connection via the interface to determine whether the selected connection is usable, and
  - based on a determination that the selected connection is not usable, close the selected connection and at least one additional connection of the plurality of connections;
- a connection establisher configured to reestablish the selected connection and the at least one additional connection; and
- a timer configured to periodically prompt the connection tester to select a connection.

10. The network device of claim 9, wherein the plurality of connections include connections to a Lightweight Directory Access Protocol (LDAP) database and the network device includes a Policy and Charging Rules Node (PCRN).

11. The network device of claim 9, wherein said timer operates with a period between a millisecond and a minute.

12. The network device of claim 9, wherein, in testing the selected connection, the connection tester is configured to attempt a read operation using the information stored in the connection cache for the selected connection.

13. The network device of claim 9, wherein, in reestablishing the selected connection and the at least one additional connection, the connection establisher is configured to:
- attempt to establish a first new connection to a primary server; and
- establish at least one additional connection to the primary server based on the attempt to establish the first new connection being successful.

14. The network device of claim 13, wherein, in reestablishing the selected connection and the at least one additional connection, the connection establisher is further configured to:
- attempt to establish a second new connection to a first secondary server based on the attempt to establish the first new connection being unsuccessful; and
- establish at least one additional connection to the first secondary server based on the attempt to establish the second new connection being successful.

15. The network device of claim 14, wherein a second secondary server is associated with the primary server and in reestablishing the selected connection and the at least one additional connection, the connection establisher is further configured to attempt to establish a third new connection to the second secondary server based on the attempt to establish the second new connection being unsuccessful.

16. A non-transitory machine-readable storage medium encoded with instructions for execution by a network device for automatically recovering connections to another device, the medium comprising:
- instructions for selecting a connection of a plurality of connections;
- instructions for periodically executing the instructions for selecting a connection of a plurality of connections based on a timer task;
- instructions for testing the selected connection to determine whether the selected connection is usable; and
- instructions for, based on a determination that the selected connection is not usable:
  - closing the selected connection and at least one additional connection of the plurality of connections, and
  - reestablishing the selected connection and the at least one additional connection.

17. The non-transitory machine-readable storage medium of claim 16, wherein the selected connection is a connection to a first device and the instructions for reestablishing the selected connection and the at least one additional connection comprise instructions for establishing at least one new connection to a second device.

18. The non-transitory machine-readable storage medium of claim 16, wherein said instructions for periodically executing include a period between a millisecond and a minute.

19. The non-transitory machine-readable storage medium of claim 16, wherein the instructions for reestablishing the selected connection and the at least one additional connection comprise:
- instructions for attempting to establish a first new connection to a primary server; and
- instructions for establishing at least one additional connection to the primary server based on the attempt to establish the first new connection being successful.

20. The non-transitory machine-readable storage medium of claim 16, wherein the instructions for reestablishing the selected connection and the at least one additional connection further comprise:
- instructions for attempting to establish a second new connection to a first secondary server based on the attempt to establish the first new connection being unsuccessful; and
- instructions for establishing at least one additional connection to the first secondary server based on the attempt to establish the second new connection being successful.

* * * * *